United States Patent
Funsch et al.

(10) Patent No.: US 11,608,841 B2
(45) Date of Patent: Mar. 21, 2023

(54) HOUSING BLOCK, METHOD FOR PRODUCING A HOUSING BLOCK, AND CORE

(71) Applicant: Robert Bosch GmbH, Stuttgart (DE)

(72) Inventors: Benjamin Funsch, Lohr (DE); Christoph Preisendoerfer, Rieneck (DE); Karl-Heinz Benning, Marktheidenfeld (DE); Maximilian Tuch, Veitshoechheim (DE); Tobias Harth, Neustadt (DE)

(73) Assignee: Robert Bosch GmbH, Stuttgart (DE)

( * ) Notice: Subject to any disclaimer, the term of this patent is extended or adjusted under 35 U.S.C. 154(b) by 100 days.

(21) Appl. No.: 16/579,925

(22) Filed: Sep. 24, 2019

(65) Prior Publication Data

US 2020/0096020 A1 Mar. 26, 2020

(30) Foreign Application Priority Data

Sep. 25, 2018 (DE) ..................... 10 2018 216 271.9

(51) Int. Cl.
*F15B 13/08* (2006.01)
*F16K 27/00* (2006.01)
*B33Y 10/00* (2015.01)
*B33Y 80/00* (2015.01)

(52) U.S. Cl.
CPC ........ *F15B 13/0814* (2013.01); *F16K 27/003* (2013.01); *B33Y 10/00* (2014.12); *B33Y 80/00* (2014.12)

(58) Field of Classification Search
CPC .. Y10T 137/877; F15B 13/0814; F16K 27/00; B33Y 10/00; B33Y 80/00
See application file for complete search history.

(56) References Cited

U.S. PATENT DOCUMENTS

| | | | | |
|---|---|---|---|---|
| 3,213,883 A | * | 10/1965 | Carls | F16K 27/003 137/884 |
| 6,398,315 B1 | * | 6/2002 | Dinkel | B60T 8/368 303/113.1 |
| 8,500,218 B2 | * | 8/2013 | Fischbach-Borazio | B60T 8/368 303/116.1 |
| 2006/0138860 A1 | * | 6/2006 | Hinz | B60T 8/368 303/119.3 |
| 2008/0246222 A1 | * | 10/2008 | Adler | F04B 1/0465 91/499 |
| 2013/0306180 A1 | * | 11/2013 | Weh | B60T 8/368 137/884 |

(Continued)

FOREIGN PATENT DOCUMENTS

DE   10 2006 062 373 A1   6/2008

OTHER PUBLICATIONS

Donaldson, "Foundry Says Robotic Sand Printing a "Game Changer" for Metal Casting", Nov. 1, 2017, Additive Manufacturing, https://www.additivemanufacturing.media/articles/foundry-says-robotic-sand-printing-a-game-changer-for-metal-casting, downloaded May 26, 2021 (Year: 2017).*

*Primary Examiner* — Seth W. Mackay-Smith
(74) *Attorney, Agent, or Firm* — Maginot, Moore & Beck LLP (57) ABSTRACT

A housing block includes channels formed in an interior of the housing block with at least one of the channels having a slot or flat-channel geometry at least in portions. A method is disclosed for producing the housing block. A sand core is disclosed to be used with the method for producing the housing block.

5 Claims, 9 Drawing Sheets

(56) References Cited

U.S. PATENT DOCUMENTS

2016/0280197 A1\* 9/2016 Mayr .................... B60T 13/662
2018/0180070 A1\* 6/2018 Uesugi .................. F16K 27/003

\* cited by examiner

Section A - A

Section B - B

Section A - A

Section A - A

Fig. 16

Section B - B

HOUSING BLOCK, METHOD FOR PRODUCING A HOUSING BLOCK, AND CORE

This application claims priority under 35 U.S.C. § 119 to patent application no. DE 10 2018 216 271.9, filed on Sep. 25, 2018 in Germany, the disclosure of which is incorporated herein by reference in its entirety.

BACKGROUND

The disclosure relates to a housing block, a method for the production thereof, and a core that can be used during the production process.

In the case of relatively complex open-loop control and closed-loop control objectives in the field of hydraulics, the required hydraulic components are commonly realized in valve blocks, which are formed either as a plate construction or in a monoblock design. Control blocks formed in a monoblock design are used in particular in the field of mobile hydraulics.

Here, the individual components, for example the valves and pressure medium connections required for the open-loop and closed-loop control, are accommodated in one housing block, in which the pressure medium channels required for conducting pressure medium are formed.

In the case of conventional production of such housing blocks, it is for example the case that semifinished parts (cast blocks) produced by casting are subject to cutting machining, and the pressure medium channels are formed as cylindrical bores by means of conventional drills.

DE 10 2006 062 373 A1 describes a control block which is produced in accordance with a generative manufacturing process. In the case of such a generative process, the component to be manufactured is constructed in layers from formless or form-neutral material (for example sintered material) utilizing physical and/or chemical effects. In the case of an SLM (selective laser melting) process, it is for example the case that metal powder is applied in layers, and the layer is, by means of a laser, melted and fused with the layers situated therebelow, such that it is even possible to form complex geometries with internally situated intersections.

The focus of the method described in DE 10 2006 062 373 A1 is that of minimizing the weight of the control blocks. Accordingly, the channels and the receptacles (valve bores) required for the connection of the hydraulic components are formed with a loading-compatible wall thickness, and possibly also with stiffening elements that reinforce the structure, such that a self-supporting structure which forms the channels and which has a relatively thin wall thickness is formed. A problem of this lightweight construction concept consists in that the control block thus formed does not withstand high pressure loads or high external mechanical loads.

In particular in the case of the channels being formed by means of drills, a problem consists in that the channel structure of a control block is, in principle, formed from an intersection of individual cylindrical channel bores with valve and component bores. These intersection/connection regions are then often restricted by the barrier regions defined at the respective valve or the hydraulic component, which barrier regions cannot be drilled.

Correspondingly, the maximum attainable throughflow area is also restricted in the case of cylindrical bores/channel structures, such that relatively high pressure losses are generated in the case of relatively high pressure medium volume flows.

SUMMARY

By contrast to this, it is the object of the disclosure to create a housing block and a method for the production thereof, wherein the formation of a flow-optimized channel structure is made possible with low outlay in terms of apparatus.

Said object is achieved with regard to the housing block, the method, and a core used in connection with the method by way of the features of disclosure.

The subclaims relate to advantageous refinements of the disclosure.

The housing block according to the disclosure, formed in monoblock design, has at least one receptacle for a hydraulic component, for example a valve. Said receptacle is fluidically connected via at least one connecting channel to further receptacles and/or to a feed or discharge connection of the housing block, wherein the channel, situated internally in the housing block, issues into the receptacle. According to the disclosure, said channel is formed at least in certain portions as a flat channel or with a slot geometry.

The formation of the internal geometry of the channels running between the receptacle and possibly from feed or discharge channels with a slot or flat-channel geometry has the advantage that the passage cross section of the connecting channel, whilst at the same time complying with restricting factors such as for example the barrier region, discussed in the introduction, of a valve or of some other hydraulic component, is enlarged, and thus the pressure loss in the presence of high pressure medium volume flows is reduced. Furthermore, owing to the enlarged throughflow cross section, the occurrence of cavitations can be prevented or at least minimized.

In a particularly preferred exemplary embodiment, the housing block, or a core used for forming the channel structure, is produced in accordance with a generative process.

By means of such a generative manufacturing process, virtually free configuration of the shape of the feed or discharge channels and of the connecting channels, for example by means of 3D printing technology or the SLM process described in the introduction, is possible, by contrast to the conventional technology, in the case of which the channels must be formed by straight or obliquely inclined cylindrical bores.

A further advantage of the generative method consists in that the desired geometry of the channel structure can be formed within the housing block already during the casting process.

In one variant of the disclosure, the core is formed as a 3D-printed sand core. Owing to the enlargement of the sand core cross section owing to the slot or flat-channel geometry, the stability of the sand core is improved in relation to a conventional sand core with cylindrical cross sections.

As discussed in the introduction, it is however also possible according to the disclosure to produce the housing block itself in accordance with a generative process, without the use of a core.

In a preferred solution, the greatest width of the channel cross section amounts to a multiple of the height of the respective cross-sectional region, such that, firstly, the stability of the structure is further improved, and, secondly, the flow cross section is yet further optimized.

The channel advantageously issues approximately radially into a circumferential surface of the receptacle or issues approximately axially into a base or annular surface of the receptacle. Alternatively, the channel may also intersect the receptacle in an approximately tangentially running manner, such that the channel extends beyond the receptacle as viewed in a flow direction, and does not issue fully into the receptacle.

In the case of such a solution, it is particularly preferred if said issuing region is widened in relation to the flat channel such that the issuing region extends over a greater circumferential portion than a region of the channel adjoining the flat channel portion.

In one exemplary embodiment, in which the channel, for example as a flat channel, issues approximately axially into a base or annular surface of the receptacle, said channel may be curved correspondingly to the circumference of the receptacle, such that the wall portions of the channel and the circumferential wall run approximately in a parallel direction.

In one exemplary embodiment, the issuing region is designed so as to extend over more than 90°, preferably more than 120° of the circumferential region of the receptacle.

The inflow or outflow into or out of the receptacle can be further improved if an annular channel is formed in said region or in some other region of the receptacle. Such an annular channel, which forms an undercut, cannot be produced, or can be produced only with great difficulty, by mechanical machining.

In the case of a method for producing a housing block, a core designed correspondingly to the channel structure is firstly produced by means of a generative process, wherein portions of the internally situated channel structure are formed as a flat channel. In a method step that follows this, the core is inserted into a casting mold, and the housing block is cast.

After this casting process, the core is removed from the housing block, such that the channel structure is formed—finish machining is not required, or is required only in the region of the connections.

Here, it is preferable if the core is formed as a 3D-printed sand core.

In an alternative method, the housing block is produced directly in accordance with a generative process, for example the SLM process mentioned in the introduction.

BRIEF DESCRIPTION OF THE DRAWINGS

Exemplary embodiments of the disclosure will be discussed in more detail below on the basis of schematic drawings, in which.

DETAILED DESCRIPTION

On the basis of the figures, a description will be given of the construction and the production of a housing block for a control block which is produced in a casting process or in accordance with a generative production process (additive manufacturing), such that the channels for conducting pressure medium are formed, without drilling or the like, between valves and other hydraulic components that are accommodated in the control block.

Figure 1:
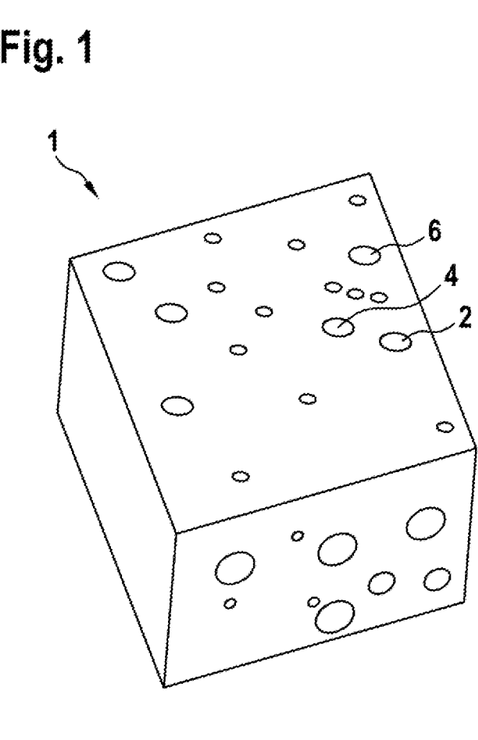
FIG. 1 shows a view of a housing block produced in a casting process.

Here, FIG. 1 shows a casting of a housing block 1 of said type, wherein a multiplicity of receptacles for the valves or other hydraulic components issue into the side surfaces. In FIG. 1, three of these receptacles, which, in principle, form valve bores, are, for example, denoted by the reference designations 2, 4 and 6.

Figure 2:
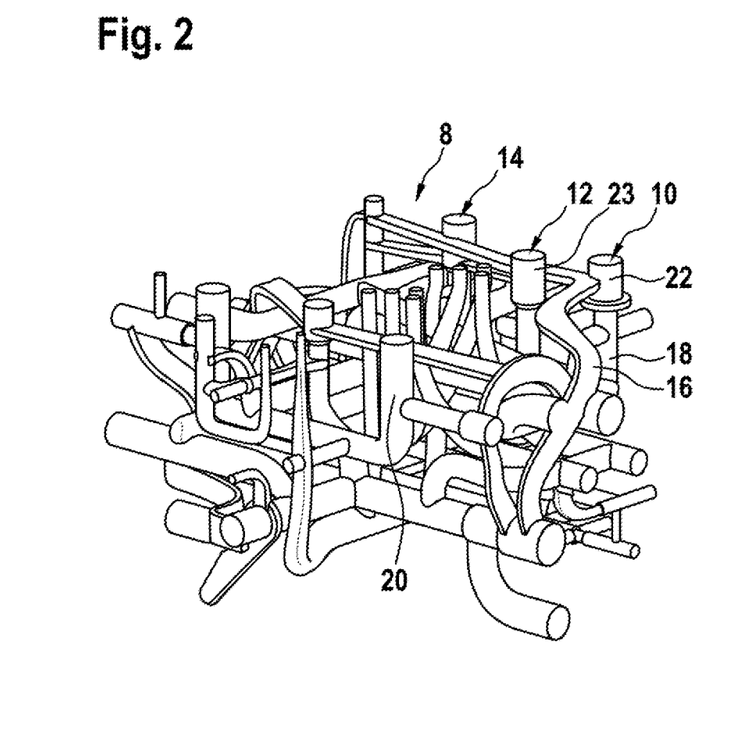
FIG. 2 shows a sand core, produced in a 3D-printing process, for producing the housing block as per FIG. 1.

FIG. 2 shows a core produced in accordance with a generative process, which core, in the specific exemplary embodiment, is formed as a sand core 8 produced in a 3D-printing process. Said sand core 8 forms the pressure medium channels via which inlet and outlet connections of the control block are hydraulically connected to the hydraulic components, for example the valves received in the receptacles 2, 4, 6, which hydraulic components are required for the activation of the one or more consumers. The receptacles 2, 4, 6 highlighted by way of example in FIG. 1 are formed by the end portions of sand core branches 10, 12, 14, which in turn are connected by core portions 16, 18, 20 which form the channels. The channel portion 18 extends approximately in an axial direction toward that end portion 22 of the sand core branch 10 which forms the receptacle 2. Said core portion 18 is formed with a circular cross section, such that a corresponding channel structure is also formed.

The core portion formed with the reference designation 16 is formed as a flat profile, such that a slot or flat-channel geometry of the formed channel is correspondingly realized. Said core portion 16 for example tangentially intersects end portions 22 and 23 of the sand core branches 10, 14, such that the correspondingly formed channel produces a pressure medium connection between the two receptacles 2, 6 and the other components, situated downstream or upstream of said channel, of the housing block 1 illustrated in FIG. 1.

In the illustration in FIG. 2, a multiplicity of such cylindrical or flattened core portions is provided, which each form channel portions which extend between the individual receptacles. For the understanding of the disclosure, it is not necessary to describe the specific profile of the core portions and thus the detailed structure of the sand core. According to the disclosure, it is to be emphasized that at least some of the core portions are formed with the described flat profile, such that corresponding internally situated channel portions are formed during the casting process.

Figure 3:
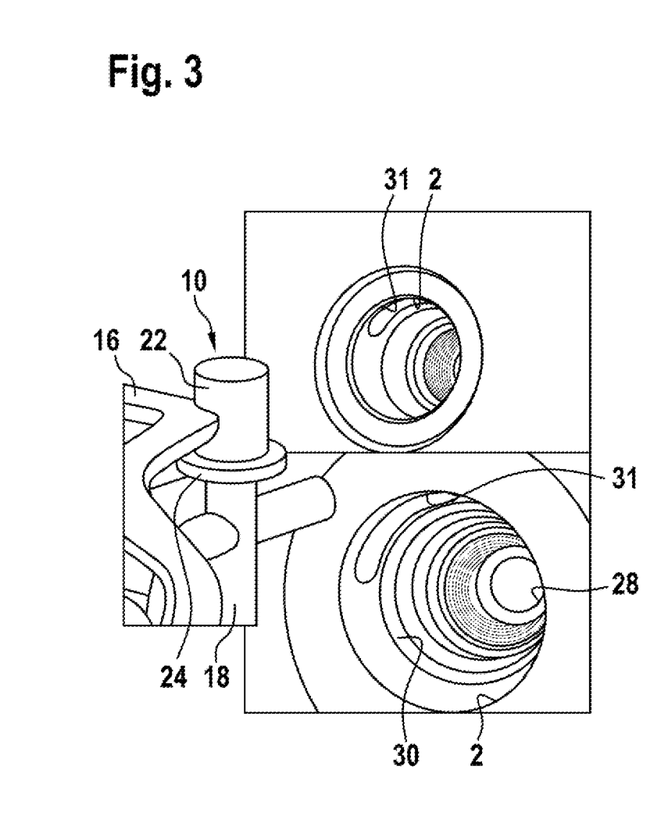
FIG. 3 is a partial illustration of the sand core as per FIG. 2 and those regions of the housing block which are formed by means of said sand core.

FIG. 3 shows that region of the sand core 8 which forms the sand core branch 10. In this illustration, it is possible to see that end portion 22 of the sand core branch 10 which forms the receptacle 2. In the transition region of said end portion 22 to the core portion 18, there is formed an annular projection 24 which is widened in a radial direction in relation to the end portion 22.

During the casting process, the receptacle 2 illustrated on the right in FIG. 3 is then correspondingly formed by the end portion 22, wherein the annular projection 24 forms an annular channel 30 in the transition region to a feed channel 28 formed by the core portion 18, which feed channel issues axially into the receptacle 2. Such a structure will be discussed in more detail below.

The core portion 16 formed with a flat profile intersects—as discussed above—the end portion 22 approximately tangentially, such that, as illustrated on the right in FIG. 3, an oval, slot-shaped issuing opening 31 is formed in the circumferential region of the receptacle 2. Said issuing opening extends over a relatively large circumferential region, wherein, depending on the profile of the core portion 16 formed as a flat profile, a circumferential region of more than 120° can be covered by the issuing opening 31. Accordingly, through suitable selection of the flat profile and of the profile of the corresponding core portions, it is possible to optimize the respective issuing regions of the channels in terms of flow, such that the inflow and outflow of the pressure medium to and from the valve or to and from the hydraulic components occurs with minimal pressure loss.

Figure 4:
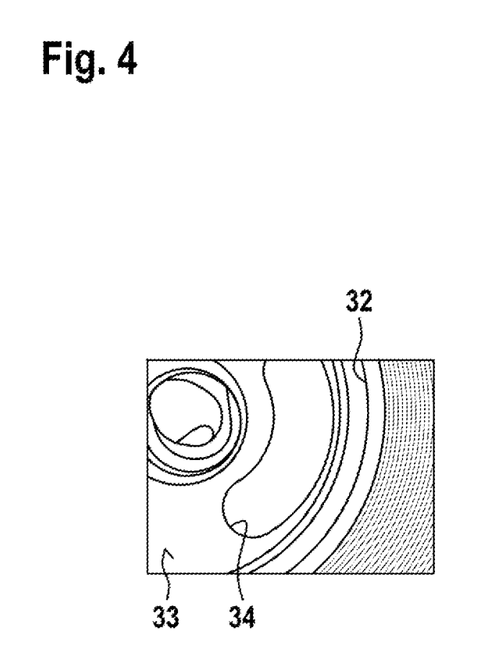
FIG. 4 shows a further region, formed by means of the sand core as per FIG. 2, of the housing block as per FIG. 1.

FIG. 4 shows a variant in which a core portion formed with a flat profile issues axially, for example in a base surface 33 of a receptacle 32. In this exemplary embodiment, the core portion is formed as an elongated curved profile, such that a kidney-shaped issuing opening 34 is correspondingly realized, the radius of curvature of which is selected so as to run with a parallel spacing to the circumferential wall of the receptacle, such that, in turn, optimum inflow or outflow ratios are ensured. It is self-evidently also possible for the kidney-shaped curved issuing opening to be obliquely inclined relative to the circumferential wall.

A number of possible variants of the embodiment of said issuing regions will be discussed on the basis of FIGS. 5 to 16.

Figure 5:
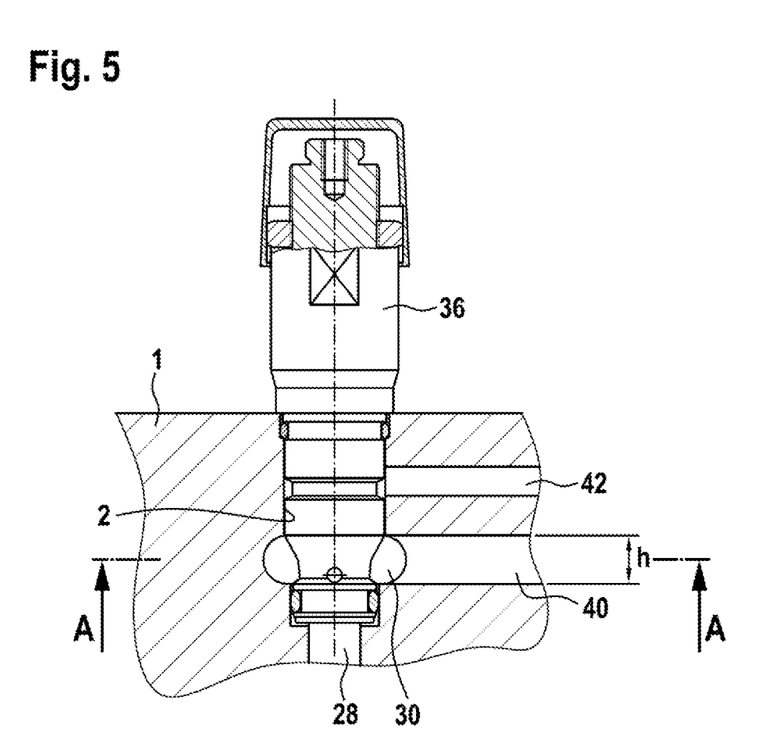
FIG. 5 is a partial illustration of a housing block in the case of which an annular channel is formed in a receptacle for a valve in the issuing region of a channel.

FIG. 5 shows, by way of example, a part of a housing block 1 in which a receptacle 2 which forms the valve bore is formed in the above-described manner. Said receptacle 2 is—as is conventional in the case of valve bores—formed as a stepped bore, into which, for example, a pressure-limiting valve 36 of cartridge design can be inserted. The basic construction of such valves is known, such that a description in this regard will not be given. The feed channel 28 formed by an axial core portion issues in the receptacle 2. Above this in FIG. 5, a discharge channel 40 issues in the receptacle 2 in a radial direction, and above this in turn, a control oil channel 42. In the exemplary embodiment illustrated, said channels 38, 40, 42 are each formed with a circular cross section. In the issuing region of the discharge channel 40, there is formed an annular channel 30 formed in accordance with the above embodiments, into which annular channel the radially running discharge channel 40 issues in a flow-optimized manner.

Figure 6:
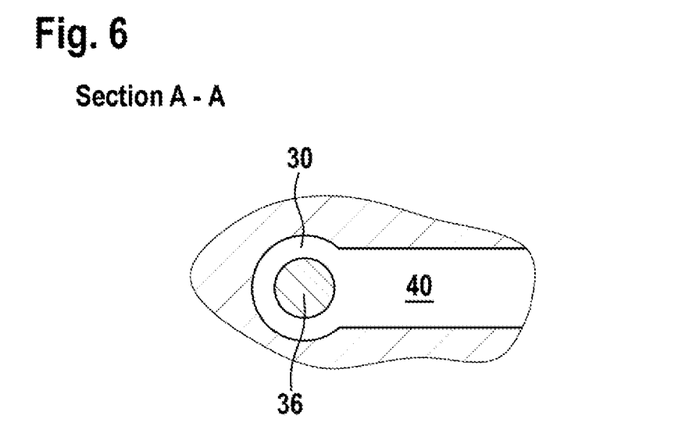
FIG. 6 shows a section along the line A-A in FIG. 5.

FIG. 6 shows a section along the line A-A in FIG. 5. It is possible in this illustration to see the schematically illustrated valve 36, which is inserted into the receptacle 2 (valve bore). Formed in the issuing region of the radially running discharge channel 40 is the annular channel 30, which engages around the valve 36 in the region of the discharge-side outlet connection, such that, in the pressure-limiting function of the valve 36, the pressure medium can flow out with minimal pressure loss. In this exemplary embodiment, a height h of the discharge channel 40 in the issuing region corresponds to the diameter of the annular channel 30.

Figure 7:
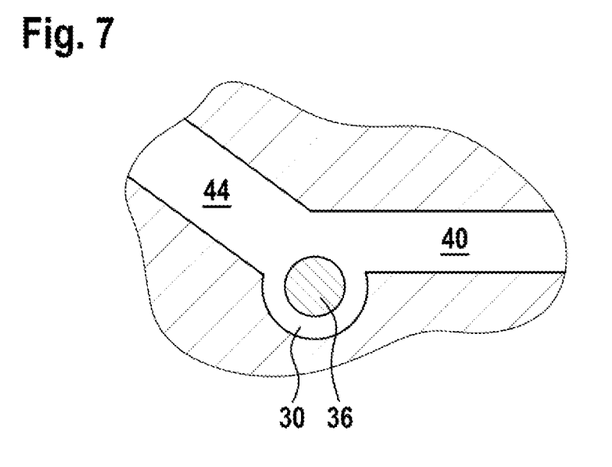
FIG. 7 shows a variant of the channel layout as per FIG. 6.

FIG. 7 shows a variant of the exemplary embodiment as per FIG. 5. In this exemplary embodiment, too, an annular channel 36 is formed in the issuing region of the discharge channel 40. The discharge channel 40 however does not issue radially into the receptacle 2 (valve bore) but rather intersects the latter tangentially, such that a pressure medium connection to the annular channel 36 is produced, and a channel branch 44 runs onward to the discharge connection of a further valve, to a pressure medium sink or to some other component. As illustrated in FIG. 6, the diameter or the width of the discharge channel 40 is smaller than the diameter of the annular channel 30.

It is self-evidently possible for such channel structures to also be formed in the region of the feed channel 38 or of the control oil channel 42.

In the exemplary embodiments described above, the channels 40, 44 are preferably formed, at least in the issuing region, as flat channels—this structure will be discussed in more detail below.

Figure 8:
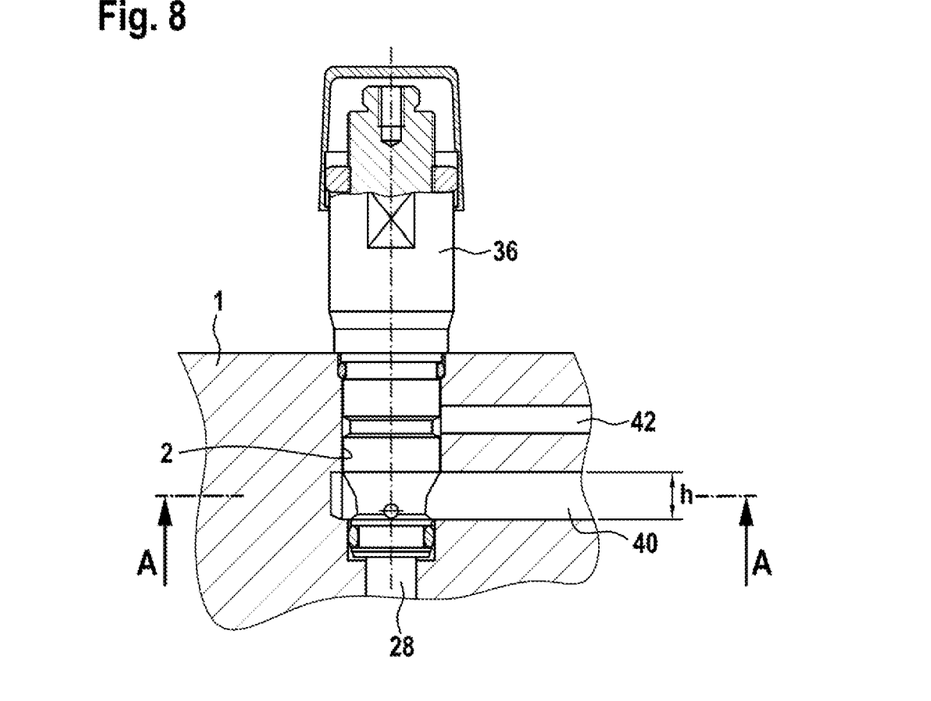
FIG. 8 shows a variant of the exemplary embodiment as per FIG. 5.

FIG. 8 shows a variant of the exemplary embodiment as per FIG. 5, wherein the discharge channel 40 again issues in radially.

Figure 9:
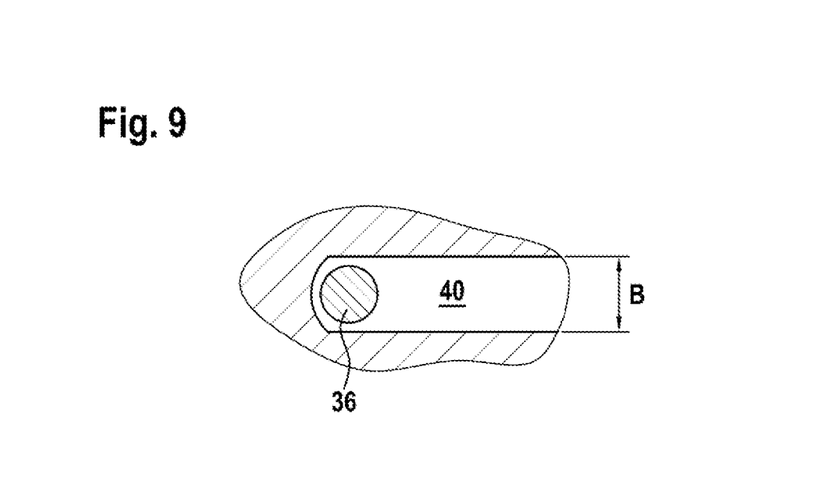
FIG. 9 shows a section along the line A-A in FIG. 8.

In this exemplary embodiment, as per FIG. 8 and the sectional illustration in FIG. 9, the discharge channel 40 is likewise formed as a flat channel, whose width B (see FIG. 9) running perpendicular to the view in FIG. 8 is greater than the height h that is visible in FIG. 8. As per FIG. 9, said width B is also greater than the diameter of the valve in said region, wherein the flat channel (discharge channel 40) extends beyond the circumference of the valve 36, such that, as per FIG. 9, a flow around the valve is possible in the region of the outlet connection. In principle—if permitted by structural space and the valve construction—it is also possible for the height h to correspond to the width B in the issuing region, such that, in turn, a channel with a circular cross section is formed which likewise extends beyond the valve 36.

Figure 10:
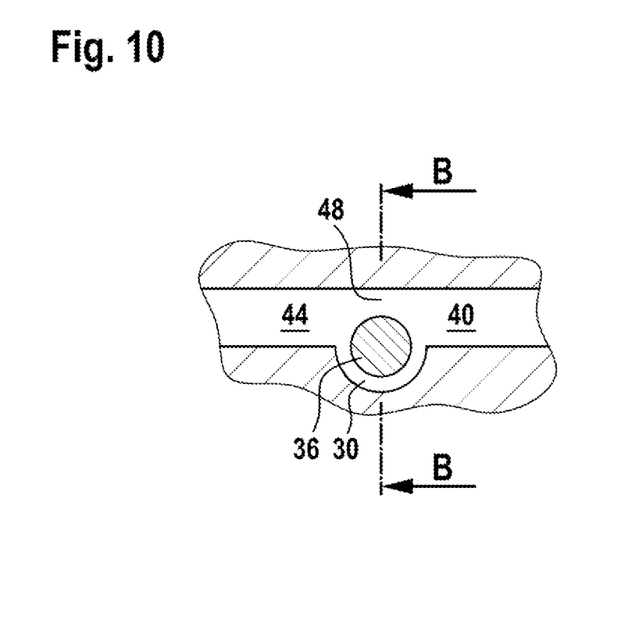
FIG. 10 shows a variant of the channel profile as per FIG. 9.

FIG. 10 shows a variant corresponding to FIG. 7, wherein the discharge channel 40 again tangentially intersects the receptacle 2 and extends with a channel branch 44 beyond the receptacle 2 or the valve 36 to the next component. In this case, it is then the case that the annular channel 30—as in the exemplary embodiment as per FIG. 7—extends only over a part of the circumference. In the case in which the channel branch 44 is not angled in relation to the discharge channel 40, said circumferential region amounts to approximately 180°. In the exemplary embodiment as per FIG. 7, the circumferential region is correspondingly larger, because in this case the channel branch 44 is angled in relation to the discharge channel 40.

Figure 11:
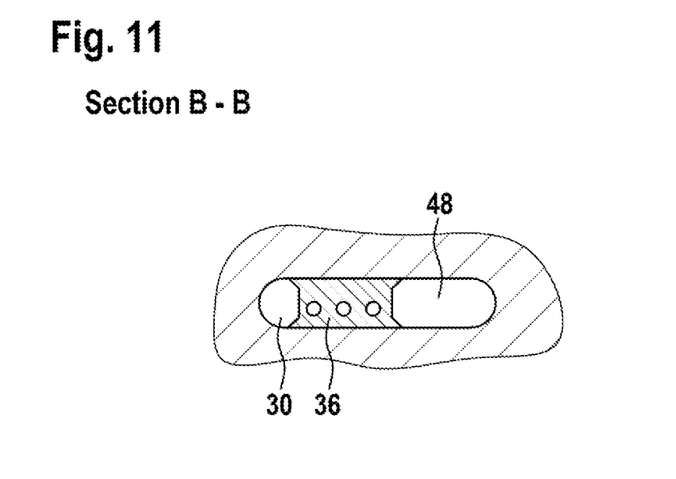
FIG. 11 shows a section along the line B-B in FIG. 10.

FIG. 11 shows a section along the line B-B in FIG. 10. In this illustration, it is possible to see the narrowed channel cross section 48 situated in the region of the transition between the discharge channel 40 and the channel branch 44, and, at the rear, the annular channel 30 which extends over a part of the circumference of the valve 36.

Figure 12:
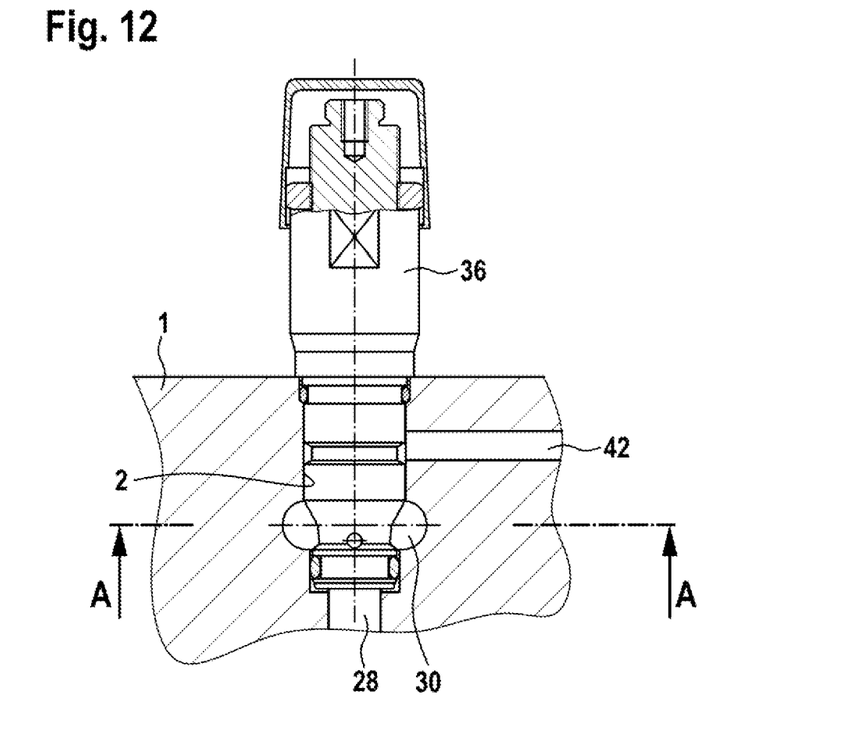
FIG. 12 is a partial illustration of a housing block, in which an annular channel is formed in a receptacle.
Figure 13:
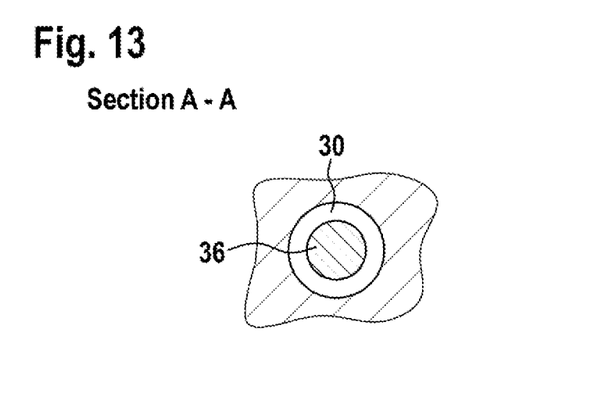
FIG. 13 shows a section along the line A-A in FIG. 12.

FIGS. 12 and 13 show an exemplary embodiment in which, in the axial spacing to the feed channel 28, an annular channel 30 is formed which, as per the sectional illustration in FIG. 13, engages around the entire circumference of the valve 36. Said annular channel 30 may then be connected, via a channel which is not illustrated, to a pressure medium sink or to some other component.

On the basis of FIGS. 14 to 16, an exemplary embodiment will be discussed in which, in the region of the discharge channel 40, there is likewise formed an encircling annular channel 30 into which the discharge channel 40 issues. As can be seen in the section as per FIG. 15, it is the case in this exemplary embodiment that the discharge channel 40 is formed with a widening 50 in the direction of the annular channel 30, which widening is for example formed such that the discharge channel 40 issues approximately tangentially into the annular channel 30 in the region situated at the bottom in FIG. 14, and opens into the annular channel 30 by means of a rounded portion in the region situated at the top in FIG. 15. Said widening 50 may self-evidently also be formed in some other way. By means of said widening 50, the outflow (or inflow) of the pressure medium from or to the valve 36 is further optimized.

Figure 15:
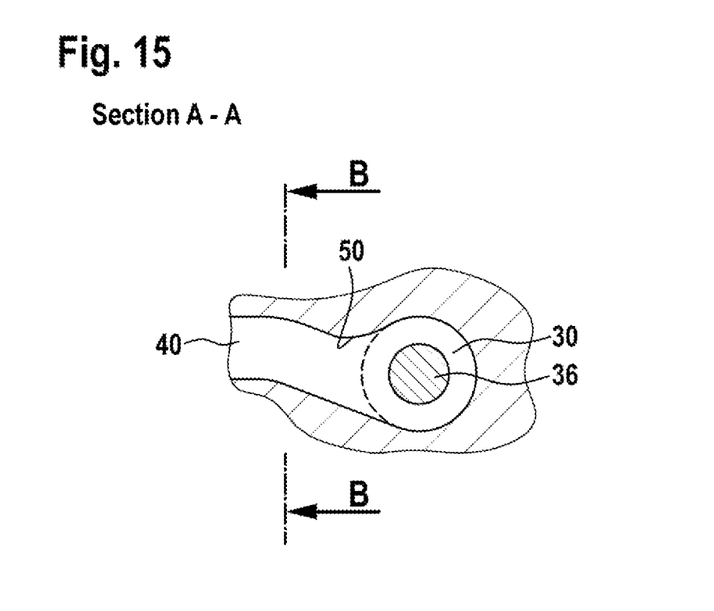
FIG. 15 shows a section along the line A-A in FIG. 14.
Figure 16:
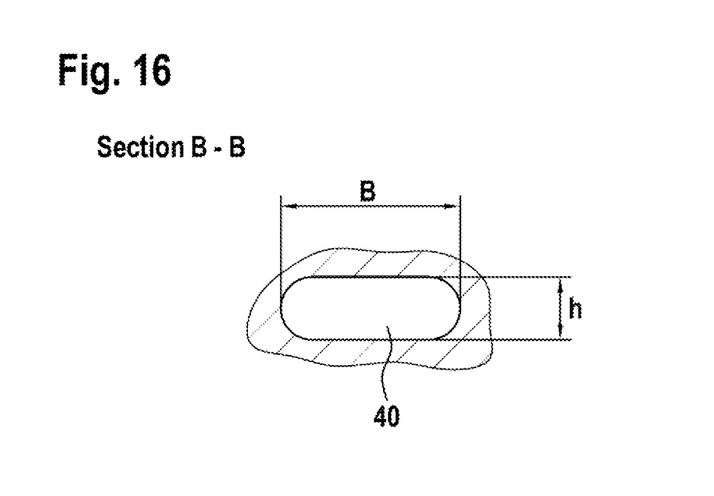
FIG. 16 shows a section along the line B-B in FIG. 15.

FIG. 16 shows the section B-B in FIG. 15. Accordingly, the discharge channel 40, which runs rectilinearly or in curved fashion, is in turn formed as a flat channel (or with a slot geometry), wherein the width B is considerably greater than the height h.

Figure 14:
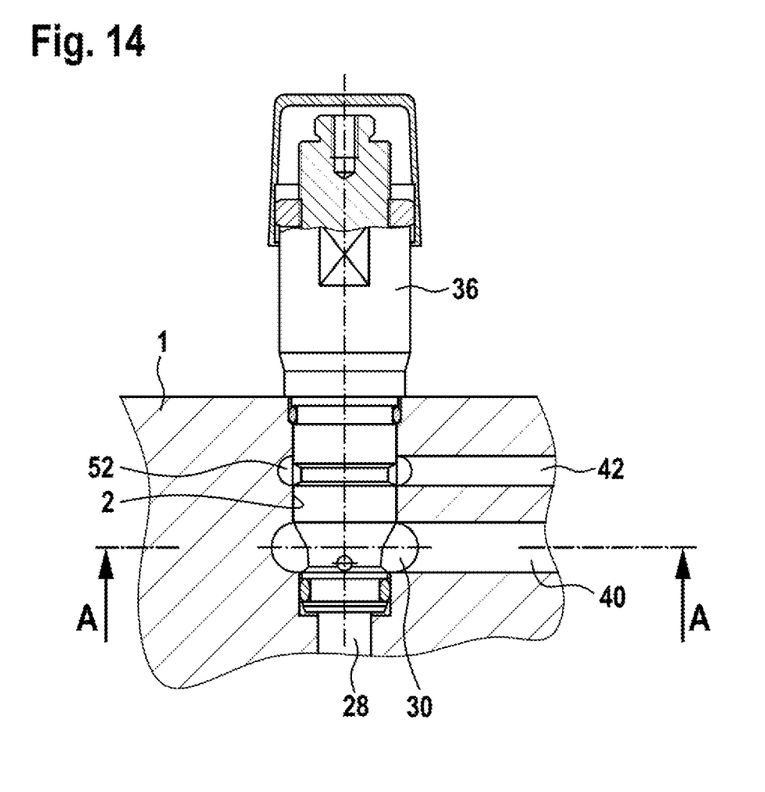
FIG. 14 shows a variant of the exemplary embodiment as per FIG. 12, in which annular channels are formed in the region of a radial connection and of a control connection.

In the exemplary embodiment illustrated in FIG. 14, it is furthermore also the case that a further annular channel 52 is formed in the region of the control oil channel 42 in the circumferential wall of the receptacle 2, into which further annular channel the control oil channel 42 then issues correspondingly to the exemplary embodiments described above, such that the control oil guidance is also optimized.

A housing block, a method for producing a housing block of said type, and a sand core usable in such a method, are disclosed, wherein channels with a slot or flat-channel geometry are formed in the interior of the housing block.

What is claimed is:

1. A housing block, comprising:
   at least one receptacle configured to receive a hydraulic component;
   at least one of a further receptacle and a feed or discharge connection;
   a connecting channel defined internally in the housing block and hydraulically connecting the at least one receptacle to the at least one of the further receptacle and the feed or discharge connection,
   wherein the connecting channel has an opening that opens approximately axially into the at least one receptacle, and a cross section of the opening of the connecting channel is kidney-shaped and curved so as to run parallel to an outer circumference of the at least one receptacle.

2. The housing block according to claim 1, wherein one of (i) the housing block or (ii) a core used during a casting process that is configured to form a channel structure including the connecting channel in the housing block is formed via a generative process.

3. The housing block according to claim 2, wherein the core is a sand core formed in a 3D printing process.

4. The housing block according to claim 2, wherein the housing block, the channel structure, and the receptacles connected to the channel structure are formed by a selective laser melting process.

5. The housing block according to claim 1, wherein a width of a cross section of the connecting channel is a multiple of a height of the cross section.

* * * * *